United States Patent [19]

Kent

[11] 4,447,841
[45] May 8, 1984

[54] OVERCURRENT PROTECTION CIRCUIT FOR A MULTIPLE OUTPUT SWITCHING POWER SUPPLY AND METHOD THEREFOR

[75] Inventor: Stephen L. Kent, Chandler, Ariz.

[73] Assignee: Motorola Inc., Schaumburg, Ill.

[21] Appl. No.: 393,564

[22] Filed: Jun. 30, 1982

[51] Int. Cl.³ .................................................. H02H 7/122
[52] U.S. Cl. ........................................ 361/18; 361/92; 363/56
[58] Field of Search ................ 361/18, 92; 363/18–21, 363/53, 56

[56] References Cited

U.S. PATENT DOCUMENTS

| | | | |
|---|---|---|---|
| 3,122,697 | 2/1964 | Kauders | 361/92 X |
| 3,200,348 | 8/1965 | Kammiller et al. | 363/56 X |
| 3,733,519 | 5/1973 | Griffey | 361/18 X |
| 3,758,841 | 9/1973 | Bourbeau | 363/56 |
| 4,024,437 | 5/1977 | Suzuki | 361/18 X |
| 4,156,273 | 5/1979 | Sato | 363/56 |
| 4,315,303 | 2/1982 | Snyder | 363/56 X |

*Primary Examiner*—Harry E. Moose, Jr.
*Attorney, Agent, or Firm*—Eugene A. Parsons

[57] ABSTRACT

An overcurrent protection circuit and method therefor for use in a multiple output switched power supply wherein the overcurrent condition accompanying a short circuit or an overload in an output circuit is detected as an undervoltage in a transformer. When the undervoltage exceeds a threshold the power supply is switched off and then on again during the cycling of a low frequency oscillator until the short or overload is removed in order to maintain the average power through the output circuit at a safe level.

8 Claims, 3 Drawing Figures

OVERCURRENT PROTECTION CIRCUIT FOR A MULTIPLE OUTPUT SWITCHING POWER SUPPLY AND METHOD THEREFOR

BACKGROUND OF THE INVENTION

The present invention pertains in general to overcurrent protection circuits and methods therefor and more particularly to overcurrent protection circuits for multiple output switching power supplies and methods therefor.

In a multiple output power supply each output may not be designed to handle the total power output. However, when an output is shorted, the power supply will deliver most of the total power to the shorted output. This means that for each shorted output, a rectifier diode, commonly placed in series with the output, must dissipate the total power. Such a diode can commonly withstand a short circuit for about 5 to 10 seconds, after which it fails due to excessive heat buildup. Thus, the key to protecting the rectifier diodes is to limit the average power dissipation in the diodes during a short.

One approach to limiting power dissipation is to place an overcurrent protection circuit in each output. One type of overcurrent protection circuit limits the current in the diode on a cycle-by-cycle basis. Another type of overcurrent protection circuit limits the average current in the diode by blanking the power supply during a short circuit. In either type of circuit, a current limiter is placed in each output.

It is desirable from the standpoint of limiting the number of parts, the amount of space required and the cost for a power supply to have a single overcurrent protection circuit for a multiple output switching power supply.

SUMMARY OF THE INVENTION

Accordingly it is an object of the present invention to provide a new and improved overcurrent protection circuit for multiple output switching power supplies.

It is a further object of the present invention to provide a new and improved method for overcurrent protection in multiple output switching power supplies.

Among the advantages of the present invention are reductions in the number of parts, in the amount of space required and in the cost for providing overcurrent protection for multiple output power supplies.

These and other objects and advantages of the present invention will become apparent to those skilled in the art upon consideration of the accompanying specification, claims and drawings.

In order to attain the above-mentioned and other objects and advantages the apparatus of the present invention involves an overcurrent protection circuit for use with a switching power supply having a voltage source coupled to a first terminal of a primary winding of a transformer, having a master oscillator coupled to a second terminal of the primary winding, having at least one output coupled to a first secondary winding of the transformer, and having at least a second secondary winding in the transformer. The apparatus according to the present invention comprises an error detection circuit coupled to the second secondary winding of the transformer for detecting an undervoltage in said second secondary winding, and a low frequency oscillator coupled to said error detection circuit and couped to the master oscillator.

The method according to the present invention involves providing overcurrent protection for a switching power supply having a voltage source coupled to a first terminal of a primary winding of a transformer, having a master oscillator coupled to a second terminal of the primary winding, having at least one output coupled to a first secondary winding of the transformer, and having at least a second secondary winding in the transformer. The method according to the present invention comprises detecting an overcurrent condition as a consequent undervoltage on the second secondary winding and disabling the master oscillator in response to said detecting of an overcurrent condition.

DESCRIPTION OF THE PREFERRED EMBODIMENTS

Figure 1:
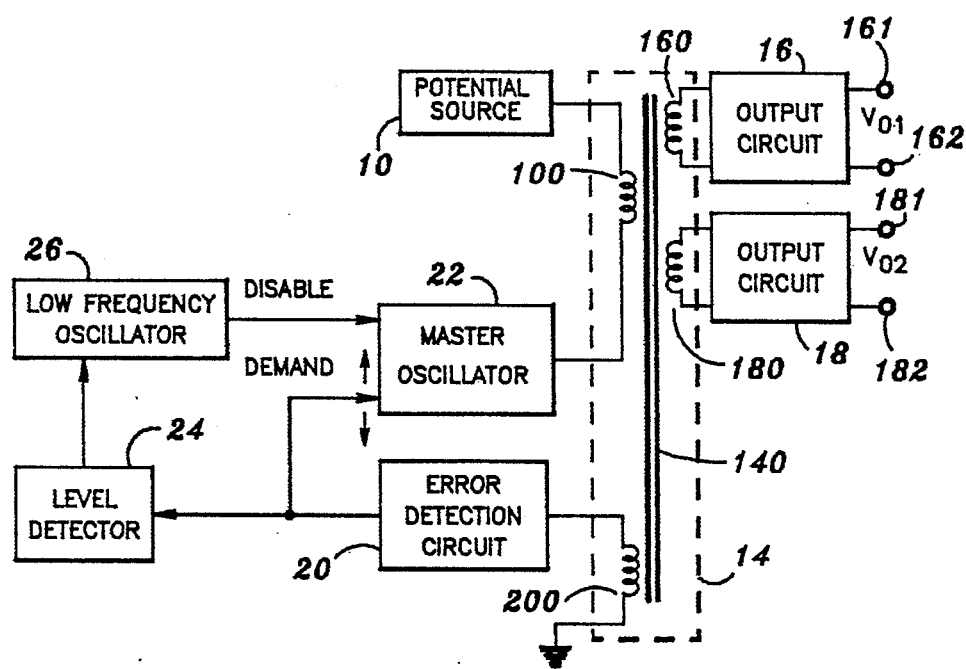
FIG. 1 is a block diagram of a preferred embodiment of the present invention.

In a preferred embodiment of the overcurrent protection circuit according to the present invention as illustrated in FIG. 1, a source of potential 10 is coupled to a first terminal of a primary winding 100 of a transformer 14 having a core 140. A plurality of output circuits, 16 and 18, are respectively coupled to a first secondary winding 160 and to a second secondary winding 180 of transformer 14. An output circuit 16 is coupled to an output terminal 161 and to an output terminal 162, while output circuit 18 is coupled to an output terminal 181 and to an output terminal 182.

An error detection circuit 20 is coupled to a first terminal of a third secondary winding 200 of transformer 14, while a second terminal of winding 200 is coupled to a ground. A master oscillator 22 is coupled to error detection circuit 20 and to primary winding 100.

As is understood by one skilled in the art, the number of output circuits coupled to transformer 14 could be as few as one and as many as is suitable for a particular application.

In the embodiment of FIG. 1 the combination of potential source 10 and master oscillator 22 produces an alternating voltage which results in an alternating flux in core 140 of transformer 14. This flux generates voltages across and currents in windings 160 and 180 directly proportional to the number of turns in windings 160 and 180 respectively. As modified by output circuits 16 and 18, the fixed relationship between windings 160 and 180 permits the obtaining of a voltage $V_{01}$, across terminals 161 and 162, and a voltage $V_{02}$, across terminals 181 and 182, having a known relationship. It is known in this way to produce a power supply having outputs at a number of different voltages, or in other words a multiple output power supply.

In order to avoid the relatively high power losses associated with linear power supplies, it is known to use a switching power supply. Switching power supplies operate by chopping an unregulated voltage using a saturated switching transistor. By varying the duty cycle of the switching transistor, the output voltage can be regulated. In the embodiment of FIG. 1, duty cycle control is accomplished by error detection circuit 20 which increases the duty cycle of master oscillator 22 in response to any drop in output voltage sensed by way of winding 200.

Consistent with Lenz's Law, the current flow in secondary windings 160 and 180 must always be in such a direction that it opposes any change in the flux of the primary current through winding 100. Therefore, when a load is connected, for example, across terminals 161 and 162, the increased current drawn through winding 160 induces a voltage in primary winding 100 in opposition to that of potential source 10. Because winding 200 is also coupled to the secondary windings 100 through a mutual magnetic flux in core 140, the opposition to the flux due to the current in winding 100 set up by the current in winding 160 results in a lowered voltage, called an undervoltage, across winding 200. As is well understood by those skilled in the art, the drop in voltage across winding 200 as sensed by error detection circuit 20 is used as part of a feedback loop to increase the duty cycle of master oscillator 22 thereby increasing the current through winding 100 to overcome the opposition due to the current in winding 160 resulting from application of a load and thus maintain the desired voltage output across terminals 161 and 162. Similarly, error detection circuit 20 is used to decrease the duty cycle of master oscillator 22 when the load is removed.

Figure 2:
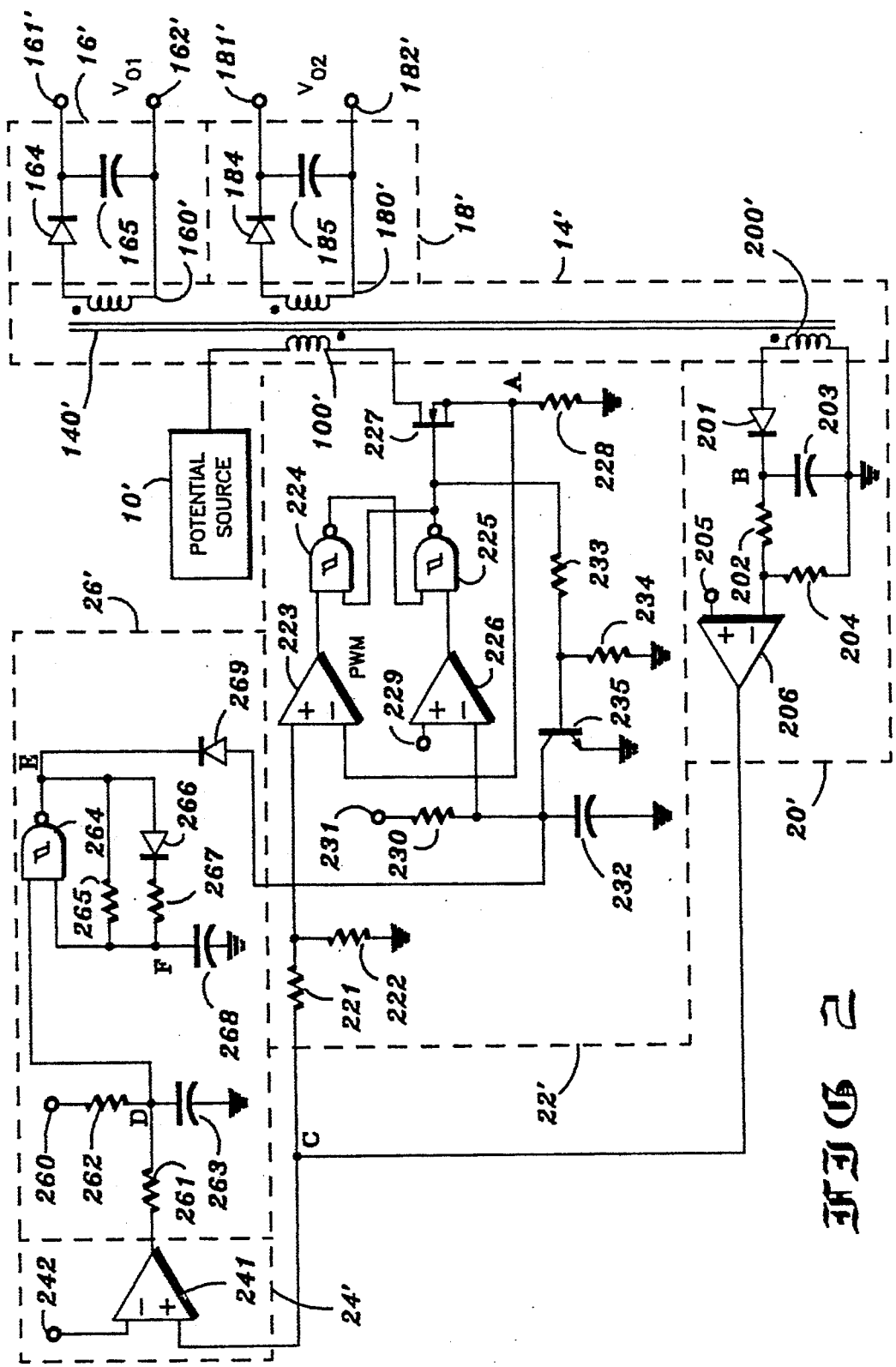
FIG. 2 is a schematic diagram of a device according to the embodiment of FIG. 1.

According to the present invention, overcurrent protection can be provided to such a switching power supply by using error detection circuit 20 as part of a second feedback loop, as shown in FIG. 1, in which error detection circuit 20 is coupled to a level detector 24 which is in trun coupled to low frequency oscillator 26 which is also coupled to master oscillator 22. A short circuit in an output causes a large current to pass through the secondary winding associated with that output resulting in a large undervoltage as sensed by winding 200. In response, error detection circuit 20 provides a very high level output signal in an attempt to greatly increase the duty cycle of master oscillator 22 in order to overcome the sensed undervoltage. By setting a threshold of level detector 24 to respond only to a very high level of output from error detection circuit 20, the dramatic undervoltage associated with a short circuit in an output can be used to trigger low frequency oscillator 26 to disable master oscillator 22. The disablement of master oscillator 22 is periodically removed due to the cycling of low frequency oscillator 26. Thus, after the short circuit is removed and the output level of error detection circuit 20 drops as a result, normal functioning resumes during the next cycle of low frequency oscillator in which the disablement of master oscillator 22 is removed.

a schematic diagram of an overcurrent protection circuit according to the present invention is shown in FIG. 2 in which elements which are similar to those in the preferred embodiment of FIG. 1 are identified by the same number with the addition of a prime to indicate a different embodiment. A flyback transformer 14' has a core 140', a primary winding 100', two secondary output windings 160' and 180', and a third secondary winding 200', also called a sense winding or a voltage feedback winding. The windings or transformer 14' are wound with a relative polarity of indicated by the dots adjacent the windings.

A first output circuit 16' is coupled to winding 160' and a first output terminal 161' and a second output terminal 162' are in turn coupled to output circuit 16'. Output circuit 16' comprises a rectifier diode 164', having an anode coupled to a first terminal of core 160' and a cathode coupled to output terminal 161', and a capacitor 165, having a first end coupled to the cathode of diode 164 and having a second end coupled to a second terminal of winding 160' and to output terminal 162'.

A second output circuit 18' is coupled to second secondary winding 180', to a third output terminal 181' and to fourth output terminal 182'. Output circuit 18' comprises a rectifier diode 184, having an anode coupled to a first terminal of winding 180' and having a cathode coupled to output terminal 181', and a capacitor 185, having a first end coupled to the cathode of diode 184 and having a second end coupled to a second terminal of winding 180' and to output terminal 182'.

An error detection circuit 20' is coupled to winding 200'. Error detection circuit 20' comprises a diode 201, having an anode coupled to a first terminal of winding 200' and having a cathode coupled to a node B, and a capacitor 203 having a first end coupled to node B and having a second end coupled to ground. Circuit 20' further comprises a resistor 202 coupled between node B and an inverting input of an error amplifier 206, having a noninverting input coupled to a terminal suitable for an application of a positive potential 205, and a resistor 204 coupled between the inverting input of error amplifier 206 and ground. A second terminal of winding 200' is also coupled to ground. An output of error amplifier 206 is coupled to a node C.

A master oscillator 22' comprises a resistor 221 coupled between node C and a noninverting input of a pulse-width modulator 223, and a resistor 222 coupled between the noninverting input of pulse-width modulator 223 and ground. An inverting input of modulator 223 is coupled to a node A. An output of pulse-width modulator 223 is coupled to a first input of a first Schmitt trigger NAND gate 224 having an output coupled to a first input of a second Schmitt trigger NAND gate 225. A second input of NAND gate 224 is coupled to an output of NAND gate 225 as is a gate electrode of an n-channel enhancement mode FET 227. A source electrode of FET 227 is coupled to a node A which is in turn coupled to a first end of a resistor 228. A second end of resistor 228 is coupled to ground. A drain of FET 227 is coupled to a first terminal of winding 100', a second terminal of which is coupled to a source of potential 10'.

A second input of NAND gate 225 is coupled to an output of a first comparator 226, a noninverting input of which is coupled to a terminal for application of a positive potential 229. An inverting input of first comparator 226 is coupled to a first end of a capacitor 232, a second end of which is coupled to ground, to a collector electrode of an NTN transistor 235, and to a first end of resistor 230, a second end of which is coupled to a terminal suitable for application of a positive potential 231.

An emitter-electrode of an NPN transistor 235 is coupled to ground while a base electrode of transistor 235 is coupled to a first end of resistor 234. A second end of resistor 234 is coupled to ground. A resistor 233 has a first end coupled to the base electrode on NPN transistor 235 and a second end coupled to the gate electrode of FET 227.

A level detector 24' comprises a second comparator 241 having an output, having a noninverting input coupled to node C and having an inverting input coupled to a terminal suitable for application of a positive potential 242.

A low frequency oscillator 26' comprises a resistor 261 coupled between the output of comparator 241 and a node D, a capacitor 262 coupled between node D and ground, and a resistor 262 coupled between node D and a terminal suitable for application of a positive potential 260. A first input of a Schmitt trigger NAND gate 264 is also coupled to node D while an output of NAND gate 264 is coupled to a node E and a second input of NAND gate 264 is coupled to a node F. A resistor 265 is coupled between nodes E and F in parallel with a diode 266 and a resistor 267. Resistor 267 has a first end coupled to node F and a second end coupled to a cathode of diode 266, an anode of which is coupled to node E. A capacitor 268 is coupled between node F and ground. Also, a cathode of a pull down diode 269 is coupled to node E while an anode of diode 269 is coupled to the inverting input of comparator 226.

As is obvious to one skilled in the art, buffering circuits can be coupled between components as is useful or desired.

NAND gates 224, 225 and 264 may be CMOS NAND Schmitt triggers, part number MC14093B, as available from Motorola, Inc., Semiconductor Products Sector, Austin, Texas. Modulator 223, comparator 226 and comparator 241 may be quad comparators, part number LM139, available from Motorola, Inc., Semiconductor Products Sector, Phoenix, Arizona. Error amplifier 206 may be an operational amplifier, part number LM158, as available from Motorola, Inc., Semiconductor Products Sector, Phoenix, Arizona. It is important to use an operational amplifier for error amplifier 206 that is capable of providing an output level ranging from ground to the high output level indicative of an overload or short. FET 227 may be an n-channel, enhancement mode, metal oxide semiconductor field effect transistor, part number MTM1225, as available from Motorola, Inc., Semiconductor Products Sector, Phoenix, Arizona.

Flyback transformers, NPN transistors, diodes, capacitors and resistors are all readily available to those skilled in the art from a wide variety of sources. It is important that there be a low level of leakage inductance (on the order of a microhenry) between the sense winding and every other secondary winding in order to detect overcurrents in the output circuits. A listing of representative component values for the other components used in the construction of a power supply according to the embodiment of the present invention as shown in FIG. 2 appears in Table I.

| Component (Element in FIG. 2) | Characteristics |
|---|---|
| 201 | IN5804 |
| 203 | 1 μF |
| 202 | 14.7 kΩ, 1% |
| 204 | 4.99 kΩ, 1% |
| 221 | 24.3 kΩ, 1% |
| 222 | 1 kΩ, 1% |
| 228 | 0.05 Ω |
| 230 | 8.66 kΩ, 1% |
| 232 | 4700 pF. |
| 233 | 33 kΩ |
| 234 | 10 kΩ |
| 235 | 2N2369A |
| 261 | 1 kΩ |
| 262 | 10 kΩ |
| 263 | 0.1 μF |
| 265 | 1 MΩ |
| 266 | 1N4148 |
| 267 | 20 kΩ |
| 268 | 1 μF |

-continued

| Component (Element in FIG. 2) | Characteristics |
|---|---|
| 269 | 1N4148 |

In the operation of the master oscillator according to the embodiment of FIG. 2, assuming a low input to modulator 223 from error amplifier 206, the inverting input of modulator 223 is driven high as the result of the current passing through node A and, therefore, the output of modulator 223 is driven below the threshold of the first input of Schmitt trigger NAND 224. When its first input is thus driven low, the output of NAND gate 224 is high, because at least one of its inputs is low. The first input of NAND gate 225 is then driven high, being coupled as it is to the output of NAND gate 224. Because it is assumed that there is a low output from error amplifier 206, the first input of NAND gate 264 is at a low level. Because at least one of its inputs is low, the output of NAND gate 264 is high, reversed biasing pull down diode 269 so that no current flows in a forward direction. Until the inverting input is driven high, the output of comparator 226 is high and the output of NAND gate 225 is low because both of its inputs are high. Because the output of NAND gate 225 is low, transistor 235 is shut off by way of voltage divider formed by resistors 233 and 234. Therefore, as capacitor 232 charges across resistor 230 from a source of positive potential applied to terminal 231, the inverting input of comparator 226 is driven high resulting in a low output from comparator 226.

When the inverting input of comparator 226 is high, the output of comparator 226 goes low, so that at least one input of NAND gate 225, the input coupled to comparator 226, goes low. This causes the output of NAND gate 225 to go high. Application of a high voltage to the gate of FET 227 allows a current to pass from potential source 10' through winding 100' and FET 227 to ground, as determined by resistor 228. Because the output of NAND gate 225 is high, FET 227 and NPN transistor 235 are turned on. Therefore, the level of current through winding 100' rises and capacitor 232 is discharge through transistor 235, thus driving the inverting input of amplifier 226 low. As a consequence, the second input of NAND gate 225 is driven high so that FET 227 and transistor 235 are turned off again. Thus, by maintaining a first input of NAND gate 225 high, its output is cycled by varying the level of its second input. A 40 kHz oscillator operating as described above was built using components having values as shown in Table I.

When the inputs of error amplifier 206 are equal, error amplifier 206 does not produce a high or low output. The inputs of error amplifier 206 are set so that they are balanced in this way when there is neither an undervoltage nor an overvoltage condition as sensed across winding 200'.

In the absence of a current in winding 200' resulting from changing flux in transformer 14', the inverting input of error amplifier 206 is tied to ground through resistor 204, and is thus pulled to a low level so that the output of error amplifier 206 goes high. However, when a current is produced in winding 200' through the action of primary 100', current passes in a forward direction through rectifier diode 201 to charge capacitor 203 and, as a result, drives the inverting input of error amplifier 206 high through resistor 202. As the inverting input of error amplifier 206 is driven up, the output of error amplifier 206 goes lower.

On the other hand, when the output of error amplifier 206 goes high in response to an undervoltage across winding 200', the noninverting input of modulator 223, otherwise held low by being tied to ground through resistor 222, is driven high through resistor 221 so that the output of modulator 223 goes high. When the output of NAND gate 225 next cycles high, both inputs of NAND gate 224 are high so that the output of NAND gate 224 goes low. Because the first input of NAND gate 225 is coupled to the output of NAND gate 224, at least one input of NAND gate 225 is then low and the output of NAND gate 225 is thus maintained at a high level, turning FET 227 until the level of flux in core 140' falls sufficiently to allow the output of error amplifier 206 to go low again. In this way this feedback loop through error detection circuit 20' controls the duty cycle of the switched oscillator 22'.

The threshold of comparator 241 is set so that the output of comparator 241 will go high only when the output of error amplifier 206 goes fully high, i.e. above a selected threshold. Such a threshold detects shorted outputs but this threshold is also exceeded under start-up conditions and during transient shorts. The undervoltage condition under start-up conditions is corrected by the use of a slow start circuit that does not allow the error amplifier to go fully high during start-up, while the problem with transient high load conditions is alleviated, in the embodiment of FIG. 2, by delay associated with charging capacitor 263 through resistor 262.

Therefore, when the output of error amplifier 206 goes fully high, the output of level detector 241 goes high, as delayed by the charging of capacitor 263 through resistor 262, and the voltage applied to the input of NAND gate 264 rises exponentially with the time constant of the circuit formed by resistor 262 and capacitor 263. The rate of discharge of capacitor 263 is limited by resistor 261. Because the first input of NAND gate 264 is low until its threshold is reached, the output of NAND gate 264 is high until the threshold of the first input of NAND gate 264 is reached. Therefore, capacitor 268 is charged through the parallel combination of resistor 265 and of diode 266 and resistor 267. As mentioned above, until the threshold of the first input of NAND gate 264 is reached the high output of NAND gate 264 also reverse biases diode 269.

Therefore, when the threshold of the first input of NAND gate 264 is reached, the output of NAND gate 264 goes low because both inputs of NAND gate 264 are high. Because diode 269 is no longer reverse biased, the inverting input of comparator 226 is pulled low by the flow of current through diode 269 so that the output of comparator 226 goes high. When the output of NAND gate 224 is high in response to a low output cycle of NAND gate 225, the output of NAND gate 225 is driven low. The output of NAND gate 225 is held low because its second input is held high and NAND gate 225 cannot cycle as long as current continues to flow through diode 269 in a forward direction. As a result, FET 227 is shut off, causing the inverting input of modulator 223 to go low, and NPN transistor 235 is turned off.

Capacitor 268, charged during the period when the output of NAND gate 264 is high, gradually discharges during the period when the output of NAND gate 264 is low until the voltage at node F falls below the threshold of the second input of NAND gate 264. At that point, at least one input of NAND gate 264 is low so that the output of NAND gate 264 again goes high, reverse biasing diode 269 so that master oscillator 22' begins to oscillate again as under normal conditions. If a short is still present, the threshold of the first input of NAND gate 264 is still high at the time when capacitor 268 is charged above the threshold of the second input to NAND gate 264 so that master oscillator 22' is again shut down for another cycle of low frequency oscillator 26'. If the short is not present when master oscillator 22' begins to oscillate, the error amplifier output falls so that the first input of NAND gate 264 falls below its threshold and is maintained below its threshold allowing continued normal operation of master oscillator 22'.

Figure 3:
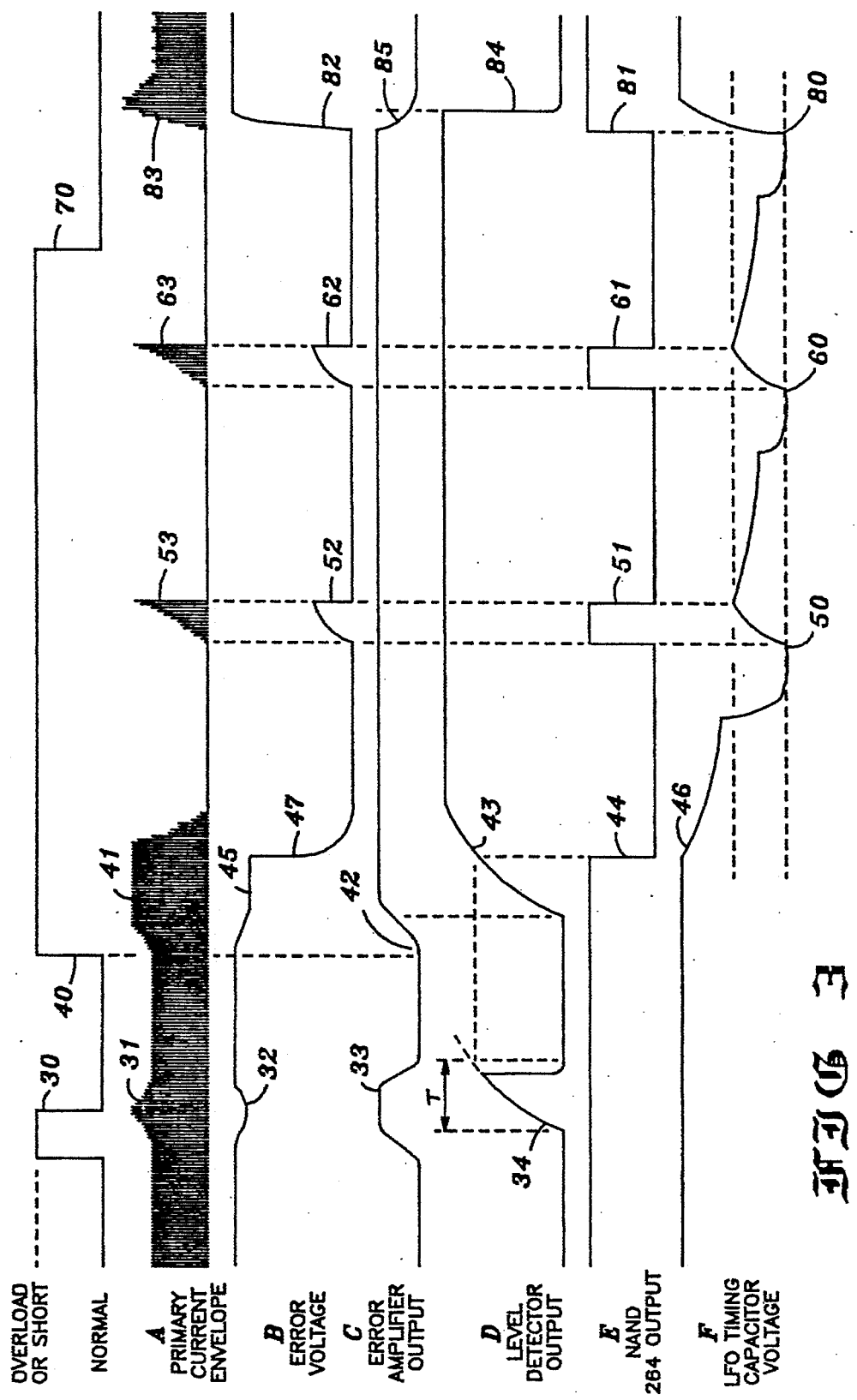
FIG. 3 is a set of representative waveforms present at various points within the embodiment of FIG. 3.

The operation of low frequency oscillator 26' is illustrated in FIG. 3. If a transient overload or short is present at an output, as illustrated at 30, the error voltage as detected at node B, falls as shown at 32. In response, the output of error amplifier 206 rises, as detected at node C, to the level illustrated at 33, driving pulse width modulator 223 to cause an increase in the primary current envelope, as detected as node A, to the degree illustrated at 31, passing the threshold of level detector 241 so that the output of level detector 241 goes high for the period illustrated at 34, as detected at node D. However, because the duration of the increased output of error amplifier 206 is shorter than the delay, $\tau$, of low frequency oscillator 26', the threshold of the first input to NAND gate 264 is not exceeded and the output of NAND gate 264, as detected at node E, remains high so that master oscillator 22' is not disabled.

In the presence of a sustained short, as illustrated by the waveform having a leading edge 40 and a trailing edge 70, a different situation arises. The drop in error voltage as shown at 45, which causes the error amplifier output to rise as shown at 42, is maintained long enough so that delay in low frequency oscillator 26' is exceeded, as shown at 43, and as a consequence the first input to NAND gate 264 goes high. The output of NAND gate 264 then goes low, as shown at 44, and the voltage across capacitor 268, as detected at node F, begins to fall as shown at 46. Because the output of NAND gate 264 is low while capacitor 268 dishcarges, from 46 to 50, master oscillator 22' is prevented from oscillating so that the error voltage falls as indicated at 47 to an extremely low level, thus maintaining the shut-down condition. When capacitor 268 has discharged to the point that the voltage across capacitor 268 below the threshold of the second input to NAND gate 264, as shown at 50, the second input to NAND gate 264 goes high, the output to NAND gate 264 goes low and the disablement of master oscillator 22' is removed.

Because the disablement of master oscillator 22' is removed, the primary current envelope as detected at node A rises as shown at 53 and the error voltage rises as shown at 52. The output of NAND gate 264 remains high, as shown at 51, during the period during which capacitor 268 is charged above the threshold of the second input to NAND gate 264. Because this threshold is exceeded, the short circuit condition still remains and the error amplifier output is still high, master oscillator 22' is again disabled.

If the short is sustained for another cycle of the frequency oscillator 60, 61, 62 and 63, which respectively correspond to 50, 51, 52 and 53, illustrate that master oscillator 22' is again shut down.

If the short is removed, as indicated by trailing edge 70, at the next time that the voltage of capacitor 268 drops below the threshold of the second input to NAND gate 264, as shown at 80, the error voltage at node B, as indicated at 82, rises to a level that causes the output of error amplifier 206 to go low, as shown at 85, so that the primary current envelope returns to normal, as illustrated at 83, and so that the output of level detector 241 falls as shown at 84, thus simultaneously ending the enablement of low frequency oscillator 26' and the disablement of master oscillator 22'.

While the present invention has been described in terms of a preferred embodiment, further modifications and improvements will occur to those skilled in the art. For example, a separate level detector is not required where the threshold of the low frequency oscillator is high enough to be directly triggered by the appropriate output level of the error amplifier. I desire it to be understood, therefore, that this invention is not limited to the particular forms shown and I intend in the appended claims to cover all such equivalent variations which come within the scope of the invention as described.

I claim:

1. An overcurrent protection circuit for use with a switching power supply having a voltage source coupled to a first terminal of a primary winding of a transformer, having a master oscillator coupled to a second terminal of the primary winding, having at least one output coupled to a first secondary winding of the transformer, and having at least a second secondary winding in the transformer, the overcurent circuit comprising:
   an error detection circuit for detecting an undervoltage in the second secondary winding, said error detection circuit being coupled to the second secondary winding of the transformer and coupled to the master oscillator; and
   a low frequency oscillator for periodically disabling the master oscillator, said low frequency oscillator being coupled to said error detection circuit and to the master oscillator.

2. The overcurrent protection according to claim 1 wherein said low frequency oscillator comprises:
   a Schmitt trigger NAND gate having a first input coupled to said error detection circuit, having a second input, and having an output coupled to said master oscillator; and
   delay means for providing feedback coupled to said output of said Schmitt trigger and to said second input of said Schmitt trigger.

3. The overcurrent protection circuit according to claim 1 or claim 2 further comprising a level detector coupled between said error detection circuit and said low frequency oscillator.

4. The overcurrent protection circuit according to claim 2 wherein said delay means for providing feedback comprises:
   a ground;
   a capacitor coupled between said second input of said Schmitt trigger NAND gate and said ground;
   a first resistor coupled to said output of said Schmitt trigger NAND gate and to said capacitor;
   a second resistor coupled to said capacitor; and
   a first diode having an anode coupled to said second resistor and having a cathode coupled to said output of said Schmitt trigger NAND gate.

5. The overcurrent protection circuit according to claim 2 or claim 4 further comprising a diode having an anode coupled to said output of said Schmitt trigger NAND gate and having a cathode coupled to said master oscillator.

6. The overcurrent protection circuit according to claim 5 further comprising a delay circuit coupled between said error detection circuit and said first input of said Schmitt trigger NAND gate.

7. The overcurrent protection circuit according to claim 6 further comprising a level detector coupled to said error detection circuit and to said first input of said Schmitt trigger NAND gate.

8. A method for providing overcurrent protection for use with a switching power supply having a voltage source coupled to a first terminal of a primary winding of a transformer, having a master oscillator coupled to a second terminal of the primary winding having at least one output coupled to a first secondary winding of the transformer, and having at least a second secondary winding in the transformer, the method for overcurrent protection comprising the steps of:
   monitoring voltage on the second secondary winding to detect the current flow in the first secondary winding;
   increasing the duty cycle of the master oscillator in response to said monitoring voltage step if said monitoring voltage step detects an undervoltage; and
   disabling the master oscillator in response to said monitoring voltage step if a predetermined overcurrent condition is detected.

* * * * *